UNITED STATES PATENT OFFICE.

CONSTANTIN FAHLBERG, OF SALBKE-WESTERHÜSEN, GERMANY.

PROCESS OF MAKING SACCHARIN.

SPECIFICATION forming part of Letters Patent No. 564,784, dated July 28, 1896.

Application filed July 23, 1895. Serial No. 556,960. (No specimens.)

*To all whom it may concern:*

Be it known that I, CONSTANTIN FAHLBERG, doctor of philosophy, a citizen of the United States of America, residing at Salbke-Westerhüsen, near Magdeburg, in the Kingdom of Prussia, German Empire, have invented a new and useful Process of Manufacturing Saccharin; and I do hereby declare that the following is a full, clear, and exact description of the invention, which will enable others skilled in the art to which it appertains to make and use the same.

Up to the present time there have been known two distinctly different methods of manufacturing saccharin, namely those described in the United States Patent No. 319,082, under the heads therein of "first method" and "second method." Of those two methods, the first proceeds from a mixture composed of ortho and para toluenesulfamids, which is obtained by means of dry ammonia-gas or ammonium carbonate from the liquid toluenesulfochlorid. Finally the mixture of orthosulfaminbenzoic acid and parasulfaminbenzoic acid obtained is treated as described in United States Patents Nos. 496,112 or 496,113, dated April 25, 1893, in order to separate the parasulfaminbenzoic acid from the orthosulfaminbenzoic acid or saccharin.

According to the second or modified method, the two isomeric sulfobenzoic acids or their salts are converted by means of phosphorous trichlorid, chlorin, and ammonia into the ammonium salt of saccharin and the diamid of parasulfobenzoic acid. The latter being almost insoluble in an aqueous solution can be filtered off, whereas from the ammonium salt of saccharin left in solution, pure saccharin may be obtained without further purification.

In the course of years several economical disadvantages have been met with in the use of said known methods.

According to the English Patent No. 6,626 of 1885 (first method) the greater part of paratoluenesulfonic acid is separated from the orthotoluenesulfonic acid by means of their sulfochlorids, of which the paratoluenesulfochlorid is solid, while the orthotoluenesulfochlorid is liquid. This method of separation has been known as the best up to the present time. However, the large quantities of phosphorous trichlorid and chlorin used in connection therewith make it a very costly method, considering that only the liquid toluenesulfochlorid enters into the manufacture of saccharin, whereas the paratoluenesulfochlorid is converted back into toluene, sulfuric and hydrochloric acids by means of superheated steam. Moreover, it has been found that the oxidation by means of potassium permanganate is very destructive toward the sulfamid group located in the ortho position, so that a large proportion of orthosulfobenzoate is met with after the oxidation in the mother liquors. This orthsulfobenzoate is then treated according to the second method described in United States Patent No. 319,382, whereby it is converted into saccharin, but not without great losses, as will be seen hereinafter.

According to the last-mentioned method the two isomeric sulfobenzoic acids are caused to form two different dichlorids of which only the ortho compound yields saccharin-ammonium, while from the other parasulfobenzoic-diamid is obtained.

With the parasulfobenzoic acid this reaction takes place almost quantitatively according to the following equation:

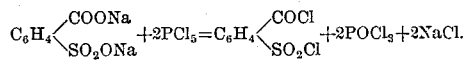

With the ortho compound the case is different. There we see that by treatment with phosphorous pentachlorid two isomeric dichlorids are formed, namely, a symmetrical dichlorid, according to the above-given equation for the para compound, and an unsymmetrical dichlorid by the following equation:

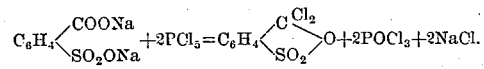

The symmetrical dichlorid can be almost quantitatively converted with ammonia into saccharin ammonium by the following equation:

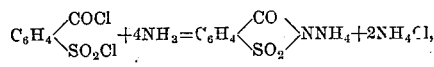

whereas the unsymmetrical dichlorid splits up with ammonia into orthocyanbenzenesulfonate of ammonium, as follows:

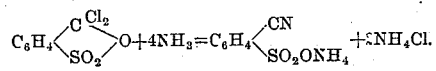

This orthocyanbenzenesulfonate of ammonium has to be subjected to repeated treatment with phosphorous pentachlorid in order to be finally converted by ammonia and hydrochloric acid according to the following three equations into saccharin:

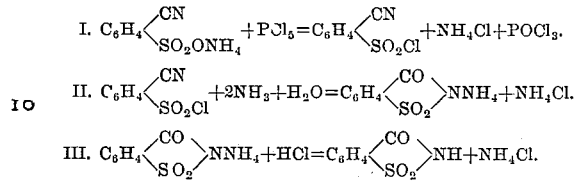

In connection with the above-described reactions there are always great losses of material noticed, which make the processes very costly.

It is the object of the present invention to so improve the production of saccharin that the inconveniences mentioned are done away with. The improvements by the aid of which this result is obtained are as follows:

The separation of the isomeric toluenesulfonic acids is not effected by means of their toluenesulfochlorids, but by their magnesium salts, of which the paratoluenesulfonate of magnesium is far more difficultly soluble in water than the corresponding orthotoluenesulfonate of magnesium.

The oxidation is not applied to the toluenesulfamids but to the toluenesulfonates, whereby I am enabled to restrain the oxidation to the methyl group only, so that waste of oxidizing agent and destruction of the sulfamid group are prevented. In this way I obtain from the oxidation an aqueous solution of the two isomeric alkaline sulfobenzoates, which is concentrated and from which by means of hydrochloric acid a mixture of the acid alkaline salts of ortho and para sulfobenzoic acids of the general formula

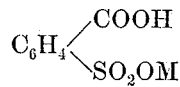

are precipitated.

The precipitated mixture of the acid alkaline salts of ortho and para sulfobenzoic acids is brought to complete dryness and then subjected to an esterification process by means of an alcohol and dry gaseous hydrochloric acid. In this process the acid alkaline salts of the isomeric sulfobenzoic acids are transformed into the ester-benzosulfonic acids of the general formula

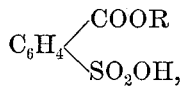

and which are obtained in a solid form by evaporating off the remainder of alcohol and hydrochloric acid after separation from the alkaline chlorid formed.

The ester-benzosulfonic acids thus obtained are first carefully neutralized with an alkaline carbonate and then with the aid of phosphorous pentachlorid converted into the ester-benzosulfochlorids of the general formula

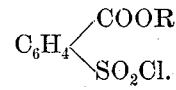

The two isomeric ester-benzosulfochlorids possess different physical properties. The ortho compound is a liquid even at a temperature $-15°$ centigrade, whereas the para compound is solid and fuses at about $+55°$ centigrade. They are both easily soluble in ether and benzene, but are almost insoluble in ice-water. The liquid orthoesterbenzosulfochlorid is capable of dissolving twenty-five per cent. of its own weight of the isomeric paraesterbenzosulfochlorid at ordinary temperatures.

The two ester-benzosulfochlorids are converted into the corresponding amids by means of gaseous ammonia or dry ammonium carbonate. According to the nature of the particular ester and the different conditions under which the above amidation is performed different results will be obtained, as will be presently described.

First. At ordinary atmospheric pressure and with sufficient quantities of ammonium carbonate or gaseous ammonia the sulfochlorid group of each of the two ester-benzosulfochlorids is equally amidized and thereby the ester-benzosulfochlorid converted into sulfaminbenzoic ester of the general formula

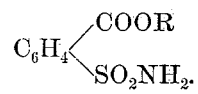

Second. At ordinary atmospheric pressure and with an excess of gaseous ammonia or ammonium carbonate the parasulfaminbenzoic ester is neither saponified nor converted into the diamid, whereas the orthosulfaminbenzoic ester is completely transformed into saccharin ammonium.

Third. In closed vessels at higher than ordinary pressures and with an excess of gaseous ammonia and ammonium carbonate the parasulfaminbenzoic ester is only partly converted into the corresponding diamid of the formula

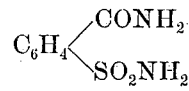

and the fusing-point of which is at about $245°$ centigrade, whereas another part of the same parasulfaminbenzoic ester is simultaneously transformed into parasulfaminbenzoic acid. A complete transformation of the parasulfaminbenzoic ester with ammonia or carbonate of ammonium is effected in the presence of water in closed vessels at about $120°$ centigrade. Under these conditions the saccharin ammonium is left unaltered.

Fourth. Should the two sulfaminbenzoic esters resulting from the treatment under 1 be boiled for a certain length of time with an aqueous solution of an alkaline carbonate, for instance, with carbonate of sodium or potassium, the result will be complete saponification of both the compounds resulting in parasulfaminbenzoate from the para compound and saccharin sodium or potassium from the ortho compound.

In order to obtain pure saccharin from the above mixture, the latter is treated according to the United States Patents No. 496,112 or 496,113.

In the separation of the orthotoluenesulfonate of magnesium from the para compound there remains a large portion of paratoluenesulfonate of magnesium, which with the aid of sulfuric acid and superheated steam is converted into acid sulfate of magnesium and toluene. The acid sulfate of magnesium and toulene are both reutilized in the preparation of fresh quantities of the isomeric toulenesulfonates of magnesium.

The parasulfaminbenzoic acid resulting from the purification process, according to United States Patents Nos. 496,112 or 496,113, is transformed, with the aid of sulfuric acid and superheated steam, into benzoic acid, benzaldehyde, and acid sulfate of ammonium.

A small quantity of the meta compound resulting from the treatment of toluene with sulfuric acid associates the other isomeres, the para and ortho compounds, throughout all the operations. It behaves like the para compound in all the reactions and is finally separated as metasulfaminbenzoic acid along with the parasulfaminbenzoic acid in the purification of the crude saccharin, according to United States Patents Nos. 496,112 or 496,113.

Having thus exhibited the nature of my improvements to the manufacture of saccharin, I now proceed to describe the series of steps or operations composing the improved manufacturing process as a whole.

Operation I: Three parts of toluene are carefully treated with eight parts of common hydrated sulfuric acid of 66° Baumé, according to United States Patent No. 319,082, (first method,) and converted thereby in a mixture of the isomeric ortho and para toluenesulfonic acids. (A small quantity of meta compound is also formed in this reaction alongside with the others, but the meta compound can be neglected in the following on account of its similar behavior with the paratoluenesulfonic acid.)

Operation II: The above mixture of toluenesulfonic acids is first treated to the extent of the excess of sulfuric acid with chalk and then the remaining toluenesulfonic acids are neutralized with caustic magnesia or carbonate of magnesium, or the whole mixture is first completely neutralized with chalk, so as to form toluenesulfonates of calcium, and then the latter are transformed with sulfate of magnesium into sulfate of calcium and toluenesulfonates of magnesium, part of the sulfate of magnesium used being that which is obtained from the regeneration of toluene, as described under Operation XI.

Operation III: The sulfate of lime formed in the preceding operation is filtered off and the aqueous solution of toluenesulfonates of magnesium concentrated to a sufficient degree of concentration to allow paratoluenesulfonate of magnesium to crystallize, the orthotoluenesulfonate of magnesium remaining in solution, together with a certain amount of paratoluenesulfonate of magnesium.

Operation IV: The last-named solution is converted by means of carbonates of potassium or sodium into the corresponding alkaline toluenesulfonates, whereby carbonate of magnesium is formed, which may be advantageously utilized in Operation II. The filtered off solution of the alkaline toluenesulfonates is then oxidized by permanganate of sodium or potassium or any other known oxidizing agent into the corresponding neutral ortho and para sulfobenzoates.

Operation V: The alkaline liquor resulting from the preceding oxidation is then evaporated to the concentration of a cold saturated solution of the salts contained therein, when the latter are precipitated therefrom with the aid of hydrochloric or any other suitable acid into the form of acid alkaline ortho and para sulfobenzoates.

Operation VI: The above precipitate is filtered off, dried, and with the aid of absolute alcohol and a current of gaseous hydrochloric acid converted into the esters of benzosulfonic acids. The alkaline chlorids formed which remain undissolved in the alcoholic solution are filtered off, and the solution is evaporated almost to dryness. The residue left in the still consists of almost pure esters of para and ortho benzosulfonic acids.

Operation VII: The contents of the still are dissolved in water and carefully neutralized in the cold with alkaline carbonate, preferably carbonate of sodium, and then evaporated to dryness. The benzosulfonic esters thus obtained are easily soluble in common alcohol as well as wood-spirit and can be crystallized out of them in well-shaped forms. The sodium salt of the ethyl ester of orthobenzosulfonic acid fuses at about 208° centigrade without decomposition, whereas under the same conditions the sodium salt of the ethyl ester of parabenzosulfonic acid undergoes partial decomposition.

Operation VIII: The alkaline salts of the esters of benzosulfonic acids are treated with phosphorus pentachlorid in order to convert them into the esters of benzosulfochlorids. After washing the product of the reaction with ice-cold water an oily liquid composed of two isomeric esters of benzosulfochlorids collects on the bottom of the vessel and can be easily drawn off from the water by means of decantation.

Operation IX: The washed esters of benzosulfochlorids are transformed by gaseous ammonia or carbonate of ammonium into the amids, and these are completely saponified with an alkaline carbonate, whereby alkaline parasulfaminbenzoates and an alkaline salt of saccharin are obtained.

Operation X: After expelling the last traces of carbonate of ammonium and ammonia the concentrated solution is first treated with a small quantity of a permanganate in order to brighten its color, and, after filtering off from the manganese-mud, treated according to United States Patent No. 319,082, so as to separate the prasulfaminbenzoic acid from the saccharin.

Operation XI: The paratoluenesulfonate of magnesium obtained as a by-product in Operation III is, with the aid of sulfuric acid and superheated steam, converted into toluene and acid sulfate of magnesium. The sulfate of magnesium is used in the decomposition of calcium toluenesulfonates into magnesium toluenesulfonates, as described under Operation II, and the regenerated toluene is reused in operation I.

Operation XII: The parasulfaminbenzoic acid obtained, together with a small quantity of metasulfaminbenzoic acid in Operation X, is subjected to the action of sulfuric acid and superheated steam, whereby benzoic acid and benzaldehyde are produced.

Having fully described my invention, what I desire to claim and secure by Letters Patent is—

1. The process of manufacturing anhydro-orthosulfaminbenzoic acid or saccharin, which consists of the following successive steps: first, converting toluene with sulfuric acid into a mixture of ortho and para toluenesulfonic acids; second, converting said acids into the magnesium salts by means of magnesium salt; third, separating the greater part of paratoluenesufonate of magnesium from the orthotoluenesulfonate of magnesium by crystallization of the former; fourth, converting the orthotoluenesulfonate of magnesium and the remainder of the paratoluenesulfonate of magnesium contained in the solution of the former with carbonate of sodium or potassium into ortho and para toluenesulfonates of sodium or potassium, and oxidizing the latter into the corresponding neutral ortho and para sulfobenzoates of sodium or potassium; fifth, converting the said neutral salts by treatment with hydrochloric acid into acid salts of ortho and para sulfobenzoates of sodium or of potassium; sixth, converting said acid sulfobenzoates into ortho and para ester-benzosulfonic acids by treatment with an alcohol and hydrochloric-acid gas; seventh, neutralizing the so-formed ester-benzosulfonic acids by carbonate of sodium and treating them with phosphorous pentachlorid in order to convert them into ester-benzosulfochlorids; eighth, transforming said ester-benzosulfochlorids into their amids by treatment with ammonia; ninth, saponifying said amids into parasulfaminbenzoates and a salt of orthosulfaminbenzoic acid or saccharin; and lastly, separating the saccharin from parasulfaminbenzoic acid, substantially as set forth.

2. In the manufacture of anhydro-orthosulfaminbenzoic acid or saccharin, the process of forming ortho and para toluenesulfonates of magnesium and the regeneration of carbonate of magnesium by a carbonate of the alkalies from said ortho and para toluenesulfonates of magnesium, for the purpose substantially as set forth.

3. In the manufacture of anhydro-orthosulfaminbenzoic acid or saccharin, the process of separating the orthotoluenesulfonate of magnesium from the greater part of the paratoluenesulfonate of magnesium by crystallization of the latter salt in order to leave the more soluble orthotoluenesulfonate of magnesium in solution for further treatment, substantially as set forth.

4. In the manufacture of anhydro-orthosulfaminbenzoic acid or saccharin, the process of forming the acid alkaline salts of ortho and para sulfobenzoic acids of the general formula

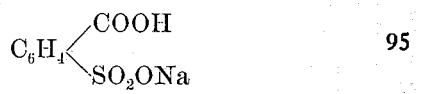

from the neutral alkaline salts of ortho and para sulfobenzoic acids by a stronger acid, such as hydrochloric acid, substantially as set forth.

5. In the manufacture of anhydro-orthosulfaminbenzoic acid or saccharin, the process of converting the acid alkaline salts of ortho and para sulfobenzoic acids by means of alcohol and hydrochloric-acid gas into the esters of the ortho and para benzosulfonic acids, substantially as set forth.

6. In the manufacture of anhydro-orthosulfaminbenzoic acid or saccharin, the process of converting the para and ortho ester-benzosulfonic acids into chlorids by neutralizing the ester-benzosulfonic acids with a carbonate of an alkali and then subjecting the formed salts to the action of phosphorous pentachlorid in order to form ester-benzosulfochlorids of the general formula

substantially as set forth.

7. In the manufacture of anhydro-orthosulfaminbenzoic acid or saccharin, the process of converting the ester-benzosulfochlorids of the general formula

into their corresponding amids by ammonia-gas or a carbonate of ammonium, substantially as set forth.

8. In the manufacture of anhydro-orthosulfaminbenzoic acid or saccharin, the process of converting the paratoluenesulfonate of magnesium obtained by separation from the orthotoluenesulfonate of magnesium into toluene and acid sulfate of magnesium by treating the same with sulfuric acid and superheated steam so as to permit the reuse of the regenerated toluene and magnesium salt, substantially as set forth.

9. In the manufacture of anhydro-orthosulfaminbenzoic acid or saccharin, the process of converting the parasulfaminbenzoic acid into benzoic acid and benzaldehyde by subjecting said parasulfaminbenzoic acid to the action of sulfuric acid and superheated steam, substantially as set forth.

In testimony whereof I have hereunto set my hand in the presence of two subscribing witnesses.

CONSTANTIN FAHLBERG.

Witnesses:
 JULIUS MUTH,
 FERNANDA FAHLBERG.